(12) United States Patent
Yoon et al.

(10) Patent No.: US 11,279,064 B2
(45) Date of Patent: Mar. 22, 2022

(54) APPARATUS AND METHOD FOR FOAM INJECTION MOLDING

(71) Applicant: SEOYON E-HWA CO., LTD., Seoul (KR)

(72) Inventors: Chi Won Yoon, Cheonan-si (KR); Dong Suk Kim, Asan-si (KR)

(73) Assignee: SEOYON E-HWACO., LTD., Seoul (KR)

( * ) Notice: Subject to any disclaimer, the term of this patent is extended or adjusted under 35 U.S.C. 154(b) by 225 days.

(21) Appl. No.: 16/386,858

(22) Filed: Apr. 17, 2019

(65) Prior Publication Data
US 2019/0322014 A1   Oct. 24, 2019

(30) Foreign Application Priority Data
Apr. 24, 2018 (KR) .......... 10-2018-0047094

(51) Int. Cl.
| | | |
|---|---|---|
| *B29C 45/26* | (2006.01) | |
| *B29C 44/58* | (2006.01) | |
| *B29C 45/00* | (2006.01) | |
| *B29K 105/04* | (2006.01) | |

(52) U.S. Cl.
CPC ........ *B29C 44/586* (2013.01); *B29C 45/0001* (2013.01); *B29C 45/26* (2013.01); *B29K 2105/04* (2013.01)

(58) Field of Classification Search
CPC .... B29C 44/586; B29C 45/0001; B29C 45/26
USPC .......................................................... 264/41
See application file for complete search history.

(56) References Cited

U.S. PATENT DOCUMENTS

2009/0168313 A1   7/2009  Wei et al.

FOREIGN PATENT DOCUMENTS

| DE | 69803114 | 6/2002 |
|---|---|---|
| JP | 2000202883 | 7/2000 |
| JP | 4138124 | 8/2008 |
| JP | 2013078913 | 5/2013 |
| KR | 20140035945 | 3/2014 |

OTHER PUBLICATIONS

Chinse Office Action—Chinese Application No. 201910306773.5 dated Jan. 14, 2021, citing JP 4138124, CN 202727230, CN 205086263, and CN 206085475.
German Office Action—German Application No. 10 2019 110 301.0 dated Jan. 12, 2021, citing JP 2013-78913, US 2009/0168313, and DE 69803114.
Korean Office Action—Korean Application No. 10-2018-0047094 dated Mar. 19, 2019, citing JP 2000-202883.

*Primary Examiner* — Jacob T Minskey
(74) *Attorney, Agent, or Firm* — Cantor Colburn LLP

(57) ABSTRACT

Provided are an apparatus and a method for foam injection molding, in which a problem in quality caused by spreading of a minute releasing distance according to conditions of an injection machine is improved by minutely releasing a first moving mold from a fixed mold using a minute releasing member for foaming and minutely releasing a second moving mold from the first moving mold using a minute releasing member for spreading of the injection machine.

4 Claims, 4 Drawing Sheets

APPARATUS AND METHOD FOR FOAM INJECTION MOLDING

BACKGROUND

1. Technical Field

The present invention relates to an apparatus and a method for foam injection molding, in which a problem in quality caused by spreading of a minute releasing distance according to conditions of an injection machine is improved by minutely releasing a first moving mold from a fixed mold using a minute releasing member for foaming and minutely releasing a second moving mold from the first moving mold using a minute releasing member for spreading of the injection machine.

2. Description of Related Art

As a conventional foam injection molding method, a foam injection molding method is disclosed in Patent Document (Korean Patent Publication No. 10-2014-0035945).

The foam injection molding method of Patent Document, as shown in FIGS. 4A to 4D, includes an injection preparation process of forming a mold cavity 5 by allowing a moving mold 1 to be pressed against a fixed mold 3 in FIG. 4A, a process of filling the mold cavity 5 with a chemical melted foaming resin when the injection is completely prepared in FIG. 4B, a mold cavity minutely releasing process of minutely releasing (extending) the mold cavity 5 by a certain amount and foaming the melted resin after an injection filling process starts in FIG. 4C, and after foaming is finished in the minutely releasing process, releasing the moving mold 1 from the fixed mold 3 and withdrawing a molded product 7 in FIG. 4D.

The molded product 7 is a product in which a foam layer 9 is formed in a center and a solidification layer 8 is formed around the foam layer 9.

A minute releasing distance d formed between the moving mold and the fixed mold by pulling the moving mold back using the injection machine by a desirable distance is within a range generally from 0.5 to 3 mm. When it is assumed that the minute releasing distance d is A, according to conditions of the injection machine, the minute releasing distance varies to A, B, or C, and the like due to spreading (irregular) such that problems such as coarse foam cells, surface denting, unfoaming, and the like occur.

For example, it is necessary to separate a mold such that d becomes 0.5 mm. Here, when the mold is separated by 1.0 mm, since a capacity of the mold cavity 5 is greater than an allowable range, the above problems occur.

RELATED ART DOCUMENT

[Patent Document]
(Patent Document 1) Korean Patent Publication No. 10-2014-0035945

SUMMARY

1. Technical Problem

A technical objective of the present invention is directed to providing an apparatus and a method for foam injection molding in which problems caused by spreading of a minute releasing distance according to conditions of an injection machine by dividing a moving mold for minute releasing for foaming and for releasing so as to absorb spreading.

2. Solutions to Problem

A foam injection molding apparatus according to the present invention includes a fixed mold; a dividable moving mold comprising a first moving mold, which is pressed against the fixed mold to form a mold cavity, and a second moving mold which faces the first moving mold; a minute releasing member for foaming, which pushes the first moving mold away from the fixed mold by a minute releasing distance for foaming; a minute releasing member for spreading of an injection machine, which pushes the second moving mold away from the first moving mold by a minute releasing distance for spreading of an injection machine; and a puller rod whose one end is fixed to the second moving mold and other end is disposed in a groove formed in the fixed mold to span the second moving mold and the first moving mold, wherein a pushing force of the minute releasing member for foaming is greater than a pushing force of the minute releasing member for spreading of the injection machine.

In the apparatus according to the present invention, the minute releasing member for foaming may include a stepped pusher pin, which pressurizes the first moving mold, a spring, which applies an elastic force to the stepped pusher pin, and a foaming releasing distance restriction groove, which is formed in the fixed mold to allow the stepped pusher pin to be slidably mounted therein.

In the apparatus according to the present invention, the minute releasing member for spreading of the injection machine may be a spring which is installed between the first moving mold and the second moving mold.

A foam injection molding method according to the present invention includes a process in which a moving mold, which is divided into a first moving mold and a second moving mold, is moved forward such that the first moving mold comes into contact with a fixed mold to form a mold cavity, a process of injecting a melted resin into the mold cavity to fill the mold cavity, a process in which after the injection and filling process begins, the first moving mold is pushed from the fixed mold such that the mold cavity extends by a minute releasing distance for foaming, and then the second moving mold is pushed from the first moving mold by a minute releasing distance for spreading of the injection machine, a process of foaming the melted resin in the mold cavity which extends by the minute releasing distance for foaming, and a process of releasing the first moving mold from the fixed mold and withdrawing a molded product when the foaming of the melted resin is completed.

3. Advantageous Effects

According to the present invention, there are present advantages as follows.

Since a first moving mold is pushed from a fixed mold by a minute releasing distance for foaming by a minute releasing member for foaming and then a second moving mold retreats from the first moving mold by a minute releasing distance for spreading of an injection machine by a minute releasing member for spreading of the injection machine, even when the injection machine pulls a moving mold by a certain distance longer than a desirable minute releasing distance for foaming, the minute releasing member for foaming is pushed by the minute releasing distance for foaming and then a residual redundant releasing distance is absorbed by the minute releasing member for foaming of the injection machine such that it is possible to obtain excellent quality by minimizing occurrence of spreading of a releasing distance according to conditions of the injection machine.

Particularly, since pull back is performed by the minute releasing distance for foaming and the minute releasing distance for spreading of the injection machine by elasticity, a retreating force of the injection machine is naturally achieved without difficulties.

Also, since a stepped pusher pin of the minute releasing member for foaming pushes the first moving mold by the minute releasing distance for foaming and then supports the first moving mold in a stop state (in which an elastic force is not present) so as to not be pushed, even when the second moving mold retreats by the minute releasing distance for spreading of the injection machine, a change is not present in an extending capacity of an initial mold cavity such that excellent quality is obtained.

[Description of Reference Numerals]

| | |
|---|---|
| 7: molded product | 8: solidification layer |
| 9: foam layer | 10: moving mold |
| 11: first moving mold (for minute releasing) | |
| 13: second moving mold (for absorbing spreading) | |
| 20: mold cavity | 21: resin inlet |
| 30: fixed mold | 50: puller rod |
| 51: flange | |
| 100: minute releasing member for foaming | |
| 110: stepped pusher pin member | |
| 111: stepped pusher pin | |
| 112: pusher pin | 113: stepped head |
| 115: spring | |
| 117: foaming releasing distance restriction groove | |
| 118: holding lip | |
| 400: minute releasing member for spreading of injection machine | |
| d: minute releasing distance for foaming | |
| d': minute releasing distance for spreading of injection machine | |

DETAILED DESCRIPTION OF EMBODIMENTS

Hereinafter, an exemplary embodiment of the present invention will be described with reference to the attached drawings. Here, the same portions as those of a conventional technique will be referred to as conventional symbols and a detailed description thereof will be omitted.

Figure 1:
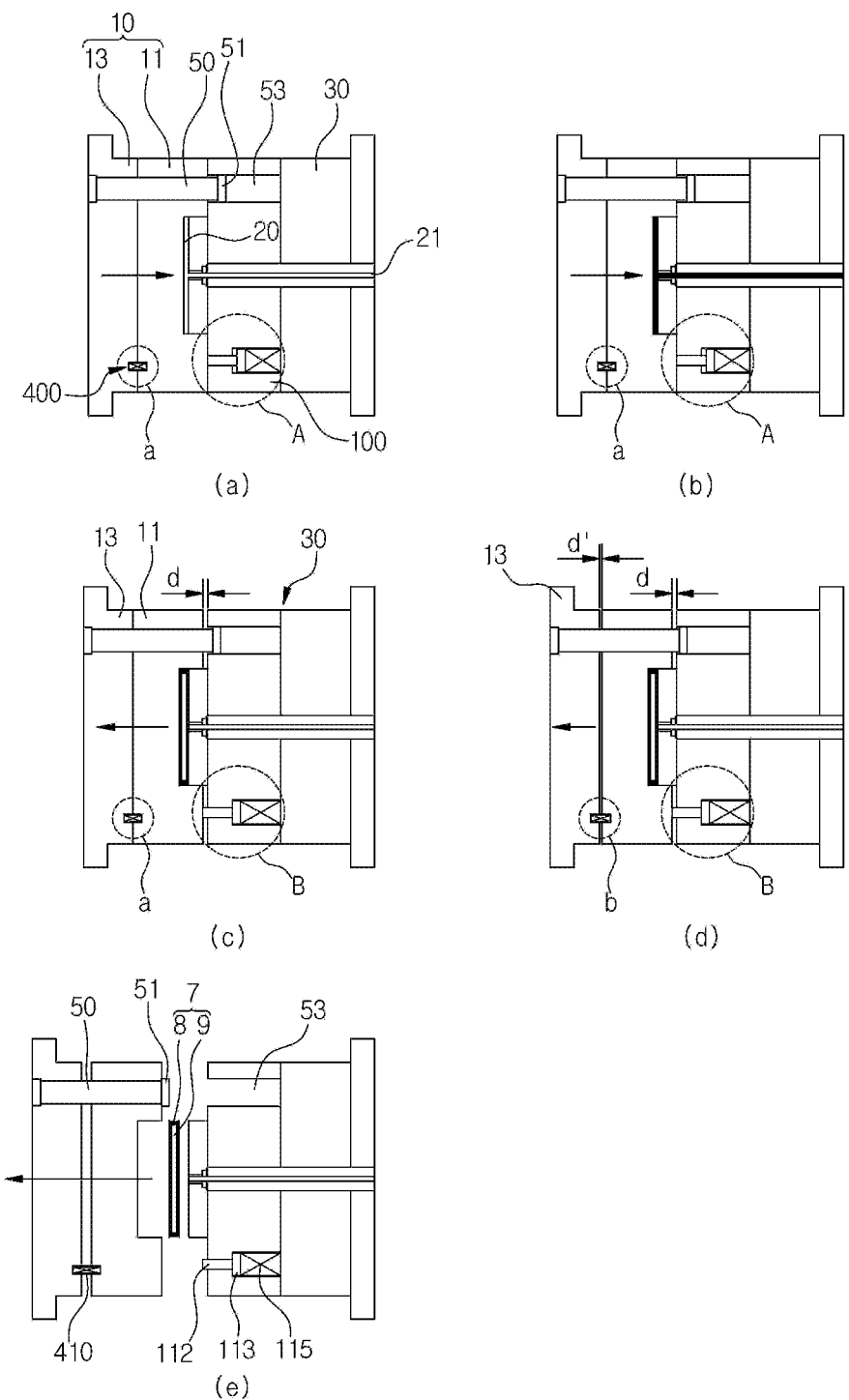
FIG. 1 is schematic process drawings illustrating a method of a foam injection molding method according to an exemplary embodiment of the present invention.
Figure 2:
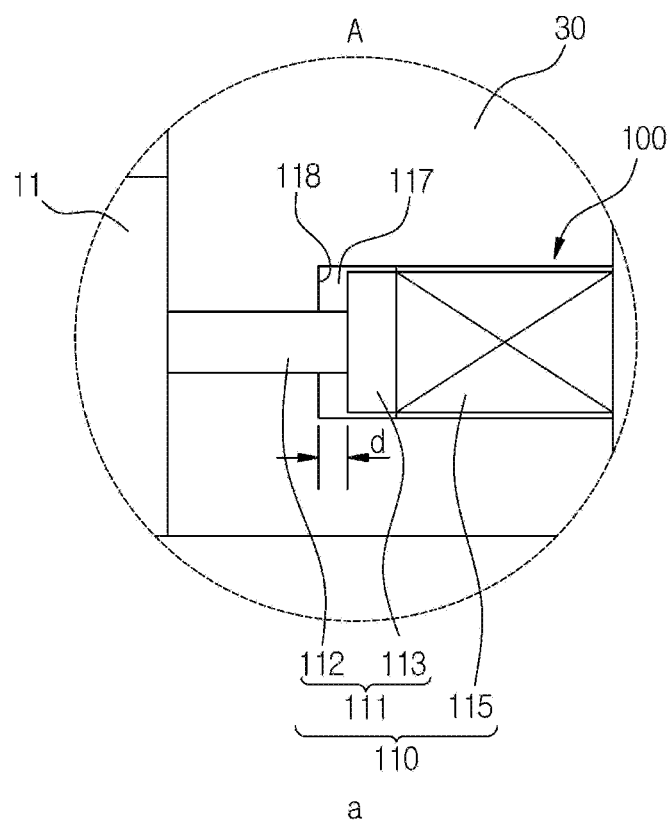
FIG. 2 is an enlarged cross-sectional view illustrating parts A and a in FIG. 1.
Figure 2:
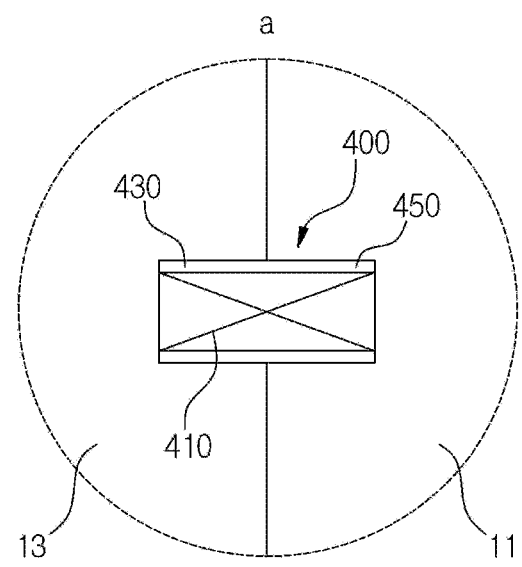
Figure 3:
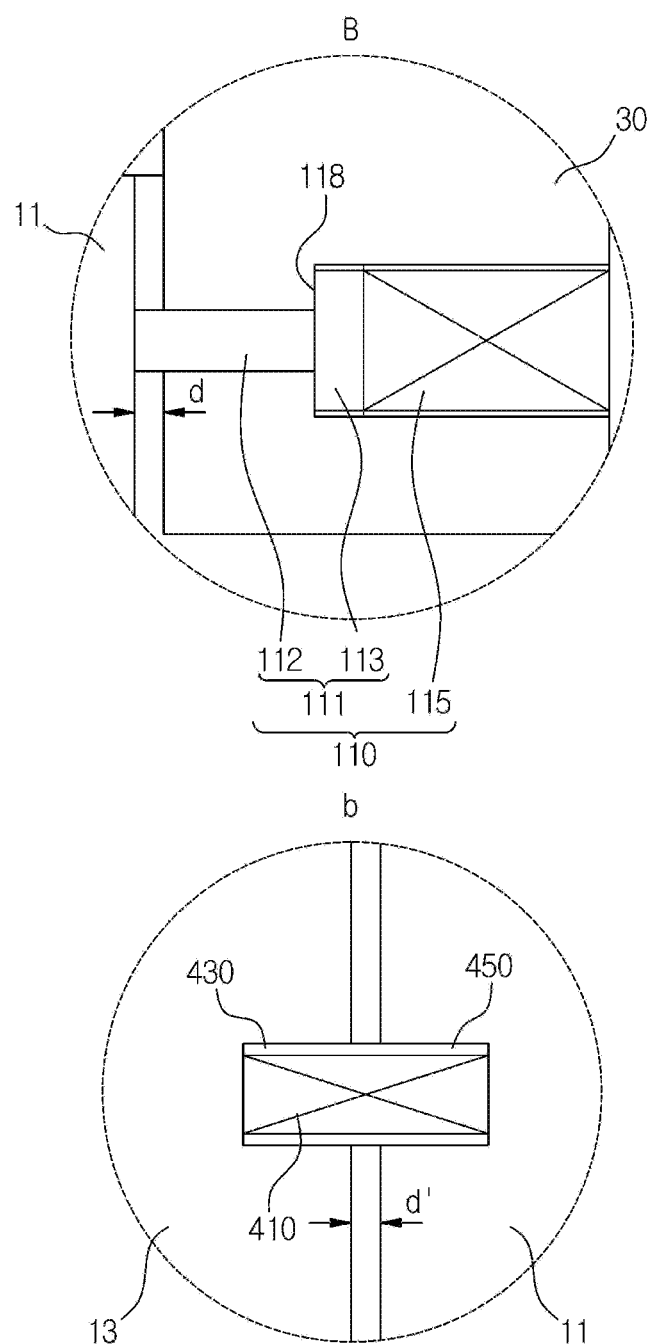
FIG. 3 is an enlarged cross-sectional view illustrating parts B and b in FIG. 1.
Figure 4:
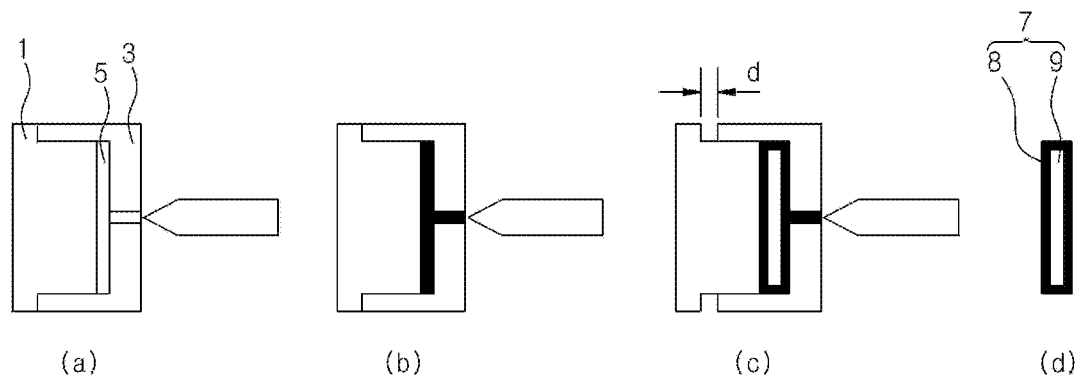
FIG. 4 is schematic process drawings illustrating a conventional foam injection molding method.

FIGS. 1A to 1E are schematic process drawings illustrating a method of a foam injection molding method according to an exemplary embodiment of the present invention. FIG. 2 is an enlarged cross-sectional view illustrating parts A and a in FIG. 1A. FIG. 3 is an enlarged cross-sectional view illustrating parts B and b in FIG. 1B.

The apparatus and method for foam injection molding using a minute releasing member for foaming and a minute releasing member for spreading of an injection machine according to the embodiment of the present invention will be described as follows with reference to FIGS. 1 to 3.

The foam injection molding apparatus according to the embodiment, as shown in FIG. 1A, includes a fixed mold 30, a dividable moving mold 10 including a first moving mold 11, which is pressed against the fixed mold 30 to form a mold cavity 20, and including a second moving mold 13 which faces the first moving mold 11, a minute releasing member 100 for foaming, which pushes the first moving mold 11 from the fixed mold 20 by a minute releasing distance d for foaming, a minute releasing member 400 for spreading of an injection machine, which pushes the second moving mold 13 from the first moving mold 11 by a minute releasing distance d' for spreading of the injection machine, and a puller rod 50 whose one end is fixed to the second moving mold 13 and other end is disposed in a groove 53 formed in the fixed mold 30 to span the second moving mold 13 and the first moving mold 11. Here, a pushing force of the minute releasing member 100 for foaming is greater than a pushing force of the minute releasing member 400 for spreading of the injection machine.

The minute releasing member 100 for foaming, as shown in FIGS. 2 and 3, includes a stepped pusher pin member 110 and a foaming releasing distance restriction groove 117 which is formed in the fixed mold 30 such that the stepped pusher pin member 110 is slidably mounted therein.

The stepped pusher pin member 110 includes a stepped pusher pin 111, which pressurizes the first moving mold 11, and a spring 115, which applies an elastic force to the stepped pusher pin 111.

The stepped pusher pin 111 includes a pusher pin 112 and a stepped head 113 having a diameter greater than that of the pusher pin 112.

When the stepped head 113 is held by a holding lip 118 of the foaming releasing distance restriction groove 117, the pusher pin 112 does not push the first moving mold 11 any more and is only in contact therewith.

Also, when the first moving mold 11 is pressed against the fixed mold 20, the stepped pusher pin 111 is pushed such that a space between the holding lip 118 and the stepped head 113 is controlled to be a minute releasing distance d.

The minute releasing member 400 for spreading of the injection machine is a spring 410 disposed between the first moving mold 11 and the second moving mold 13.

Also, the spring 410 is installed between a groove 450 of the first moving mold 11 and a groove 430 of the second moving mold 13 such that the first moving mold 11 and the second moving mold 13 easily are pressed against each other.

Hereinafter, a foam injection molding method using the foam injection molding apparatus according to the embodiment will be described.

As shown in FIG. 1A, the first moving mold 11 of the moving mold 10 is pressed against the fixed mold 30 to form the mold cavity 20. In this state, as shown in FIG. 2A, the pusher pin 112 of the fixed mold 30 enters by the minute releasing distance d for foaming due to the first moving mold 11.

In a mold clamping state in which the first moving mold 11 of the moving mold 10 is pressed against the fixed mold 30, as shown in FIG. 1B, the mold cavity 20 is filled with a melted foaming resin such as chemical foam, physical foam, and the like, which is injected through a resin inlet 21 of the fixed mold 30.

In the embodiment, the melted foaming resin is a resin in which a foaming agent is mixed.

When the melted foaming resin is completely injected and fills the mold cavity 20 and the first moving mold 11 of the moving mold 10 is pulled back by the minute releasing distance d for foaming as shown in FIGS. 1C and 3A, the mold cavity 20 extends by the minute releasing distance d for foaming such that foaming is performed in the melted foaming resin.

That is, when the moving mold 10 is pulled back by the injection machine, the pusher pin 112 elastically pushes the first moving mold 11.

An elastic force of the pusher pin 112 is applied until the stepped head 113 is held by the holding lip 118.

In order to absorb a redundant force of the injection machine, which is applied even when the first moving mold 11 of the moving mold 10 retreats by the minute releasing distance d for foaming and then the pusher pin 112 is not pushed anymore and stopped, the second moving mold 13 retreats from the first moving mold 11 by the minute releasing distance d' for spreading of the injection machine as shown in FIGS. 1D and 3B.

In order to pull only the second moving mold 13 back by the minute releasing distance d' for spreading of the injection machine while the first moving mold 11 is stopped at the minute releasing distance d for foaming, an elastic force of the spring 115 for foaming should be greater than an elastic force of the spring 410 for spreading of the injection machine.

A difference in the elastic force is necessary to uniformly maintain the minute releasing distance d for foaming by preventing the first moving mold 11 from moving forward using the minute releasing member 100 for foaming when the minute releasing member 400 for spreading of the injection machine applies the elastic force.

When foaming is performed while the minute releasing distance d for foaming and the minute releasing distance d' for spreading of the injection machine are maintained, a molded product 7 including a foaming layer 9 thereinside and a solidified layer 8 around the foaming layer 9 is finished, the moving mold 10 is completely released from the fixed mold 30 as shown in FIG. 1E and the molded product 7 is withdrawn.

In order to completely release the moving mold 10 from the fixed mold 30, a flange 51 of the puller rod 50, which is fixed to the second moving mold 13, retreats with the second moving mold 13 and pulls the first moving mold 11 while being held by a bottom surface thereof.

When the puller rod 50 comes into close contact, the flange 51 is slidably disposed in the groove 53 formed in the fixed mold 30.

As described above, the first moving mold 11 functions as a minute releasing mold for foaming and the second moving mold 13 functions as a mold for absorbing spreading of the injection machine so as to solve a quality problem caused by spreading even when a retreat distance of the injection machine is longer than the minute releasing distance d.

As described above, it is possible to significantly increase the quality of a molded product by removing spreading of the minute releasing distance d of the injection machine using the minute releasing member 100 for foaming and the minute releasing member 400 for spreading of the injection machine.

Although the embodiments according to the concept of the present invention have been described above in detail, the embodiments may be variously changed and may have a variety of shapes and are not restricted by particularly disclosed shapes and include all changes, equivalents, and substitutes, which are included in the concept and technical scope of the present invention.

The invention claimed is:

1. A foam injection molding apparatus comprising:
a fixed mold;
a dividable moving mold comprising a first moving mold and a second moving mold facing the first moving mold, wherein the first moving mold is configured to be pressed against the fixed mold to form a mold cavity;
a first minute releasing member for foaming, wherein the first minute releasing member is configured to push the first moving mold away from the fixed mold by a first minute releasing distance for the foaming; and
a second minute releasing member for spreading of an injection machine, wherein the second minute releasing member is configured to push the second moving mold away from the first moving mold by a second minute releasing distance for the spreading of the injection machine, when the first moving mold retreats as much as the first minute releasing distance,
wherein a pushing force of the first minute releasing member for the foaming is configured to be greater than a pushing force of the second minute releasing member for the spreading of the injection machine.

2. The apparatus of claim 1, wherein the first minute releasing member comprises a stepped pusher pin pressurizing the first moving mold, a spring applying an elastic force to the stepped pusher pin, and a foaming releasing distance restriction groove formed in the fixed mold to allow the stepped pusher pin to be slidably mounted therein.

3. The apparatus of claim 1, wherein the second minute releasing member is a spring installed between the first moving mold and the second moving mold.

4. The apparatus of claim 1, further comprising: a puller rod whose one end is fixed to the second moving mold and other end is disposed in a groove formed in the fixed mold to span the second moving mold and the first moving mold.

* * * * *